UNITED STATES PATENT OFFICE.

WILLIAM B. STODDARD, OF STAMFORD, CONNECTICUT, AND VAMAN R. KOKATNUR, OF ARLINGTON, NEW JERSEY, ASSIGNORS TO PILOT LABORATORY, INC., OF ARLINGTON, NEW JERSEY, A CORPORATION OF NEW JERSEY.

PROCESS OF BLEACHING FOODSTUFFS.

No Drawing. Application filed September 2, 1927. Serial No. 217,296.

This invention relates to a process of bleaching animal and vegetable matter such as food stuffs, soaps, waxes and the like and in its preferred embodiment and most advantageous use is concerned particularly with a process of and agent for bleaching food stuffs which may, among others, contain chromophoric oil-bearing materials, e. g., flour, cottonseed and other seed meals, egg yolk, oils, fats and the like.

Organic peroxids heretofore have been used in the bleaching of food stuffs and particularly milling products and vegetable oils, benzoyl peroxid having been the only one extensively employed in such bleaching processes. Benzoyl peroxid, while regarded as being less harmful in bleaching food stuffs than most other peroxids, and materially less harmful than the cheap inorganic bleaching agents such as chlorine, nitrogen peroxid and the like, is expensive and belongs to a class of bodies whose use has been more or less restricted by the federal food and drug act.

There has long been a demand for a bleaching process for food stuffs notably flour, seed meals and edible oils, which would be efficient, cheap, and not only entirely harmless but adapted to exert a beneficial action upon food materials bleached thereby, and we have long sought to provide a food bleaching process wherein the bleaching agent employed after finally completing its bleaching function, would leave a residue which is itself a recognized wholesome food materal known to be incapable of deleteriously affecting the material treated by such process.

We have now discovered that many animal and vegetable materials, and particularly food stuffs such as flour, cottonseed and other seed meals, egg yolk, oils and fats can be readily, satisfactorily and very cheaply bleached by the action of a peroxidized food constituent or constituents, and that the bleached product after the final action of such peroxid or peroxids thereon, will contain as a residue from such peroxids a food material from which, or from the constituents of which, the bleaching agent was obtained by peroxidation. In accordance with our invention broadly considered, any suitable material, itself a food or a food constituent, is peroxidized. In the subsequent process of bleaching, it breaks up into oxygen and the food material originally peroxidized, whereby nothing remains in the bleached material except a wholesome food product which is a beneficial addition thereto.

We also have found that by employing some peroxidized food materials as bleaching agents, such peroxidized food materials not only give up oxygen during the bleaching operation and leave a residue which is composed of the food material from which the peroxid used as the bleaching agent, was produced, but this residue, which is itself a wholesome food material, acts as an activating catalyst to aid the undecomposed peroxid in giving up its oxygen, and thus increases the efficiency of the bleaching operation.

The terms peroxidized food constituents or materials, are intended to include any peroxy compound or compounds made from any constituent or constituents of a foodstuff. As examples of such peroxidized food constituents may be mentioned peroxy compounds of alcohols such as glycerine, cholesterol, phytosterol; oxaldehydes like arabinose, glucose; acids like malic, maleic, succinic, citric, lactic, tartaric, pectic, saccharic, glyceric, arabonic, mucic, erythritic, cinnamic, anisic, levulinic; amino acids like aspartic, glutaric, phenylaminopropionic, tyrosine, leucine, and lysine.

Among the food materials hereinabove set forth, all of the aldehydes and practically all of the acids, excepting perhaps anisic and amino acids, are activators for their peroxids or their peroxidized compounds.

We may employ in our process any individual peroxidized food-constituent or a mixture of such peroxidized food constituents. We prefer to employ in some cases peroxy compounds of food constituents that are constitutionally similar to the coloring matter itself or to the constituents with which the coloring matter in the foodstuff is associated. It should be noted that carotin, the coloring matter in flour, for instance, is of the same general nature as the vehicle in which it is dissolved. The term "constitutionally similar" means of the same class of compounds or chemically similar. Thus in bleaching fatty oils containing for example, carotin as the coloring matter, a peroxidized compound of either a fatty acid or fatty acid ester would be chemically similar to the vehicle (oil) of the coloring matter. Because the fatty oil is an ester and contains fatty acids as constituents and is a vehicle for the coloring matter, the chemical similarity to this peroxidized compound is evident.

We therefore prefer in some cases to employ peroxy compounds of food constituents that are chemically similar to the constituents with which the coloring matter in the food stuffs is associated and which also are physically similar to the coloring matter itself. Carotin, the coloring matter in flour is dissolved in an oil. We therefore prefer to use a peroxid of a fatty acid as the bleaching agent for flour, as such a peroxid is chemically similar to the vehicle (oil) of the carotin, and is physically similar to the carotin itself.

The term "of the same general nature" means physical similarity. Since carotin is a hydrocarbon, there is no chemical similarity between it and a peroxidized compound of either a fatty acid or fatty acid ester, but as both are oily, water resistant, and water insoluble, they are both of the same general physical nature. Thus in bleaching molasses for instance, a peroxy compound of a polyhydroxyaldehyde or acid, may be used. In bleaching chromophoric oil-bearing materials, a peroxy compound of fatty acids, as mentioned in our application Serial Number 173,784, filed March 8th, 1927, is advantageously used. In bleaching proteins or albuminoids, a peroxidized amino acid may be used with advantage.

The term peroxy compounds is used to include organic peroxids, peracids, peracid salts, hydroperoxids and the like. The peroxy compounds of the food constituents may be made by any well known peroxidation methods such as by the action of hydrogen peroxid or its salts on certain derivatives of the food constituents. The peroxy compounds may, depending upon the nature of their stability and explosibility, be handled somewhat differently. They may be mixed with suitable inert fillers or solvents and the composition used for bleaching. Pure peroxid compounds may also be used for bleaching as in the case of fatty acid peroxy compounds.

The amount of peroxid compound or composition to be used for bleaching depends among other things, upon the percentage of available oxygen in the bleaching material and upon the percentage and constitution of the coloring matter in the material to be bleached. Thus if the material to be bleached contains a large amount of coloring matter, proportionately larger amounts of the bleaching composition have to be used than if the material to be bleached contains a small amount of coloring matter. If the pigment to be bleached be carotin, for example, the following formula can be developed for the bleaching of carotinoid materials. If Y is the per cent of carotin in the material to be bleached, and X is the amount of the material to be bleached, and Z is the percentage of active oxygen in the bleaching composition, the amount of 100 per cent pure bleaching composition needed theoretically to bleach X parts of the material containing Y per cent carotin, would be $$\frac{X \times Y}{3Z}$$

As a rule 100–200 per cent excess of the bleaching material over that theoretically required, is found to be necessary to bleach a material satisfactorily. In the case of peroxy compounds that leave a food residue, the excess of the bleaching agent used is not at all deleterious, though expensive. The formula gives the theoretical amount of the bleaching agent needed to bleach carotinoid materials. Given the constitution of other coloring matters than carotin, the principle disclosed in the foregoing formula, will enable one skilled in the art to determine the proportional amount of the bleaching composition theoretically needed to bleach food materials carrying such other coloring matter.

While we have described in detail the preferred practice of our invention it is to be understood that the procedure set forth may be varied and that our invention is not limited thereto except as set forth in the subjoined claims.

We claim:

1. The process of bleaching comprising subjecting the material to be bleached to the action of a peroxidized compound constitutionally similar to the vehicle of the coloring matter in the material to be bleached.

2. The process of bleaching comprising subjecting the material to be bleached to the action of a peroxidized compound constitutionally similar to the vehicle of the coloring matter in the material to be bleached and of the same general nature as the coloring matter.

3. The process of bleaching comprising subjecting the material to be bleached to the action of a mixture of peroxidized compounds constitutionally similar to the vehicle of the coloring matter in the material to be bleached.

4. The process of bleaching comprising subjecting the material to be bleached to the action of a mixture of peroxidized compounds constitutionally similar to the vehicle of the coloring matter in the material to be bleached and of the same general nature as the coloring matter.

5. The herein described process of bleaching which comprises subjecting the food material to be bleached to the action of peroxidized food material adapted upon decomposition in the bleaching process to revert to the original food material whose peroxid was employed as the bleaching agent.

6. A process of bleaching comprising subjecting the food material to be bleached to the action of a peroxidized food material.

7. A process of bleaching comprising subjecting the food material to be bleached to the action of a peroxidized food material, such food material being an activator for the undecomposed peroxidized food material.

8. A process of bleaching food material comprising subjecting the food material to be bleached to the action of peroxidized food material, and activating the peroxid compound with the same food material which was used for making the peroxid.

9. A process of bleaching comprising subjecting the food material to be bleached to the action of a peroxidized food material, and activating the peroxid with the food material residue from the decomposition of the peroxid in the bleaching operation into oxygen and such food material.

In testimony whereof we affix our signatures.

WILLIAM B. STODDARD.
VAMAN R. KOKATNUR.